(12) United States Patent
Whytock et al.

(10) Patent No.: US 8,578,283 B2
(45) Date of Patent: Nov. 5, 2013

(54) SUPPRESSING UNWANTED UI EXPERIENCES

(75) Inventors: Chris Whytock, Seattle, WA (US); Maxim Oustiougov, Seattle, WA (US); Thibaut Vial, London (GB); Joon Chang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 12/253,571

(22) Filed: Oct. 17, 2008

(65) Prior Publication Data

US 2010/0100831 A1   Apr. 22, 2010

(51) Int. Cl.
*G06F 3/048* (2013.01)

(52) U.S. Cl.
USPC ............ 715/764; 715/781; 715/805; 715/866; 715/789; 715/808

(58) Field of Classification Search
USPC .................................. 715/764, 808, 741, 743
See application file for complete search history.

(56) References Cited

U.S. PATENT DOCUMENTS

| | | | | |
|---|---|---|---|---|
| 5,596,702 | A * | 1/1997 | Stucka et al. ................. | 715/746 |
| 6,404,423 | B1 * | 6/2002 | Kivela et al. .................. | 345/212 |
| 6,629,129 | B1 | 9/2003 | Bookspan et al. | |
| 6,664,982 | B1 * | 12/2003 | Bi ................................. | 715/773 |
| 6,701,350 | B1 | 3/2004 | Mitchell | |
| 6,874,126 | B1 * | 3/2005 | Lapidous ...................... | 715/711 |
| 7,353,234 | B2 | 4/2008 | Kimball et al. | |
| 7,533,345 | B2 * | 5/2009 | Krebs ........................... | 715/745 |
| 7,627,833 | B2 * | 12/2009 | McKnight et al. ........... | 715/809 |
| 7,770,126 | B2 * | 8/2010 | Townsend et al. ........... | 715/766 |
| 2003/0001887 | A1 | 1/2003 | Smith, IV | |
| 2003/0037243 | A1 * | 2/2003 | Gruteser et al. .............. | 713/185 |
| 2003/0046401 | A1 * | 3/2003 | Abbott et al. ................. | 709/228 |
| 2006/0004738 | A1 | 1/2006 | Blackwell et al. | |
| 2006/0036952 | A1 * | 2/2006 | Yang ............................. | 715/741 |
| 2006/0085581 | A1 * | 4/2006 | Martin .......................... | 710/260 |
| 2006/0136829 | A1 | 6/2006 | Abbar et al. | |
| 2006/0242124 | A1 * | 10/2006 | Fields et al. .................. | 707/3 |
| 2007/0220444 | A1 * | 9/2007 | Sunday et al. ............... | 715/788 |
| 2007/0294627 | A1 * | 12/2007 | Sauve et al. .................. | 715/760 |
| 2008/0148235 | A1 * | 6/2008 | Foresti et al. ................ | 717/123 |
| 2010/0194703 | A1 * | 8/2010 | Fedor et al. .................. | 345/173 |

OTHER PUBLICATIONS

"What's new for V5R3", iSeries Information Center, Version 5, Release 3, http://publib.boulder.ibm.com/infocenter/iseries/v5r3/index.jsp?topic=/rzajr/rzajrwhatnew.htm.
"Suppressing Balloon Pop-Ups" http://msdn.microsoft.com/en-us/library/ms940877.aspx.

* cited by examiner

*Primary Examiner* — Steven B Theriault
*Assistant Examiner* — Amy M Levy
(74) *Attorney, Agent, or Firm* — Alleman Hall McCoy Russell & Tuttle LLP

(57) ABSTRACT

Methods to allow, suppress, or reformulate a presentation of a UI element invoked by a computer program are provided. One method includes applying an administrator-configurable heuristic to determine whether to allow a native presentation of the UI element, to suppress the native presentation of the UI element, or to enable a reformulated presentation of the UI element. The method further includes one or more of suppressing and reformulating the UI element in accordance with a determination of the heuristic.

14 Claims, 5 Drawing Sheets

SUPPRESSING UNWANTED UI EXPERIENCES

Background

A software product, e.g., an operating system or application, may interact with one or more users via a user interface (UI). The user interface may present various UI elements chosen to facilitate interaction with the user-textual, graphical, and/or audible UI elements, for example. Various computer systems-desktop computers, laptop and handheld computers, cell phones, as examples-may be configured to present UI elements in a standard way to provide functional recognizability and ease of use among various software products. Thus, many software users are now familiar with common UI elements such as scroll bars, dialog boxes, and the like.

However, some computer systems may be configured to present a premium UI experience based on non-standard UI elements. With such computer systems, the appearance of standard or other UI elements may be distracting to the user, and may detract from the user's experience of the computer system.

SUMMARY

Therefore, in one embodiment, a method to control a presentation of a UI element invoked by a computer program is provided. The example method includes applying an administrator-configurable heuristic to determine whether to allow a native presentation of the UI element, to suppress the native presentation of the UI element, or to enable a reformulated or otherwise modified presentation of the UI element, where the native presentation is allowed if it is determined to be consistent with a user-navigation experience provided by the operating system (OS) shell in execution. The method further includes one or more of suppressing and reformulating the UI element in accordance with a determination of the heuristic.

Other embodiments of the present disclosure provide a related system for controlling one or more of an anticipated presentation and an unanticipated presentation of a UI element on a computer system, and, a system for gating an unanticipated presentation of one or more UI elements on a computer system.

It will be understood that the summary above is provided to introduce in simplified form a selection of concepts that are further described in the detailed description. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
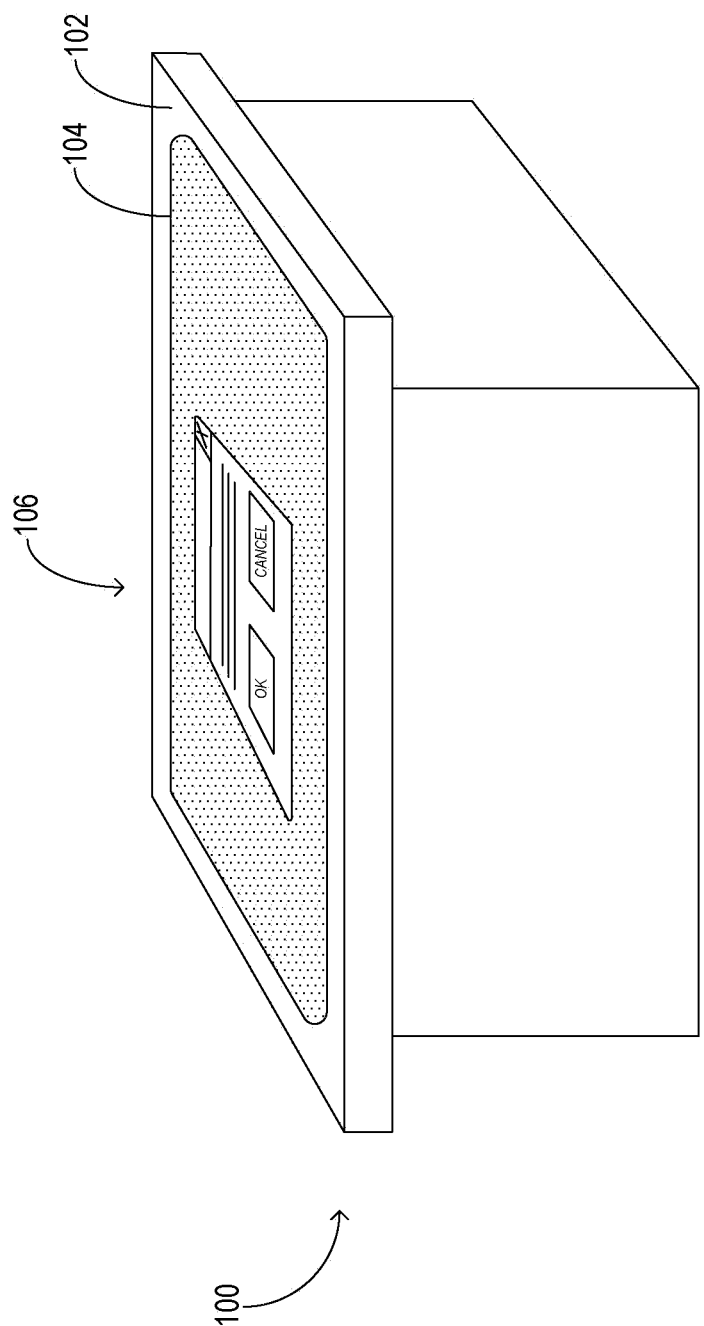
FIG. 1 shows elements of an example computer system in accordance with the present disclosure.

FIG. 1 shows elements of an example computer system 100, which is configured to provide a premium UI experience to a user, or, in some embodiments, to one or more users. The premium UI experience may include a facile, tactile, and organic experience. Thus, the illustrated computer system includes horizontal display surface 102, which includes viewable zone 104. The horizontal display surface may be configured to present text and graphics; it may be a projection screen, a liquid-crystal display screen, a plasma-type display screen, etc.

It will be observed that the user may access computer system 100 from virtually any direction, and therefore, software products specially configured to run on the computer system may be configured to register an orientation of the user and to provide a user-orientation appropriate or user-orientation independent image to horizontal display surface 102.

In some embodiments, horizontal display surface 102 may provide input functionality as well as display functionality. Thus, the horizontal display surface may be a touch-sensitive display, a motion-sensitive display, etc. By virtue of the display and input functionality of the horizontal display surface, the user may interact bi-directionally with computer system 100. Further, in some embodiments, audible interaction with the user may be enabled. Thus, the computer system may include (not shown in the drawing) various integrated audio transducers—loudspeakers, microphones, etc., and/or jacks for connectivity to external audio transducers.

The described UI functionality may be further enabled via operative coupling of horizontal display surface 102 and other components to one or more processors and to one or more device-readable storage media. Thus, FIG. 2 schematically shows other exemplary aspects of computer system 100.

Figure 2:
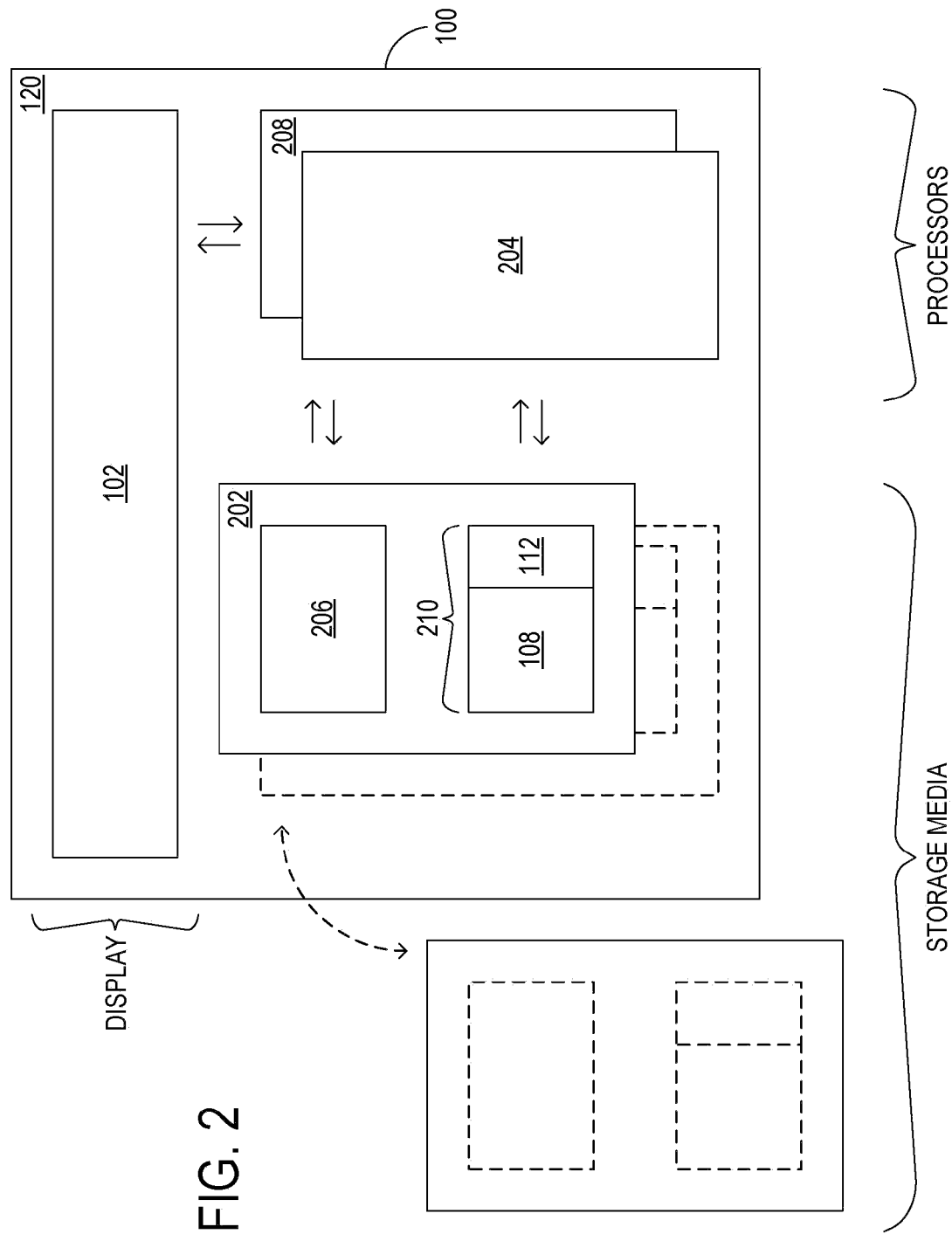
FIG. 2 schematically shows other aspects of the example computer system of FIG. 1, in accordance with the present disclosure.

FIG. 2 shows device-readable storage medium 202 operatively coupled to first processor 204 and embodying a first program of instructions 206. The illustrated embodiment also includes additional device-readable storage media, located inside or outside computer system 100, and a second processor 208. No aspect of FIG. 2 will be understood in a limiting or restrictive sense, for other embodiments fully consistent with this disclosure may include only one processor, or more than two. Further, the various processors and/or device-readable storage media may be provided under the same enclosure or otherwise distributed over a network.

Computer system 100 may be configured to provide a premium UI experience by virtue of a specialized hardware configuration and/or an enhanced functionality of one or more software products that may be executed via the computer system. Such software products may include dedicated applications configured especially for computer system 100 and a dedicated operating-system (OS) shell. The OS shell may be configured to provide facile user access to one or more dedicated applications or features of the computer system under a unified motif. Further, the OS shell may manage some or all of the bi-directional UI experience, interpreting input from a touch sensitive zone of horizontal display surface 102, creating user-orientation appropriate or user-orientation independent graphical output, etc. In one example, the OS shell may invoke a virtual keyboard on a touch sensitive zone of display surface 102 when input from a keyboard is requested, and, it may conceal the virtual keyboard when input from the keyboard is not requested.

However, computer system 100 may be configured to run other software products as well. These may include common, non-dedicated applications and generic operating systems. Such software products may invoke generic UI presentations that are antagonistic to the intended UI experience; therefore, an object of the present disclosure is to provide one or more approaches to suppress them.

A UI presentation may be antagonistic to the intended UI experience for a number of reasons, several of which are described presently, by way of example. In one example, a hardware configuration of computer system 100 may not adequately enable one or more UI elements included in the presentation. This may be the case for input boxes, text boxes, and combo boxes, which anticipate input from a keyboard. Embodiments such as illustrated in FIG. 1 may lack a keyboard unless or until a virtual keyboard is provided via the OS shell. Stated another way, the UI elements in the presentation may be inert to the user because they do not recognize the input mechanisms available to the user. A UI element configured for input via a generic pointing device (e.g., a mouse) may not respond properly/at all to touch input from horizontal display surface 102, for example.

In a second example, one or more UI elements included in the presentation may be styled according to the underlying operating system instead of the user-visible navigation experience. In this context, even graphically based UI elements-check boxes, scroll bars, etc., may appear clumsy and inelegant if rendered over a differently styled navigation experience.

In a third example, the presentation of UI elements may be too technical for an intended user of the computer system. Intended users of computer system 100 may include, for example, patrons of a bar or restaurant, or a purchasers of tickets at an automated kiosk. Under these and other circumstances, it may be advantageous to conceal from the user as many technical details of the computer system as possible. Such details may include error messages, error codes, references to directory paths, etc.

In a fourth example, the presentation may include UI elements that are not or cannot be properly oriented on horizontal display surface 102. As indicated above, a user may approach the horizontal display surface from virtually any direction, but generic UI elements are oriented for a substantially vertical display (e.g., a computer monitor) which the user may access normal to the display surface. Examples of UI elements that cannot be oriented in a user-orientation independent way include windows with title bars, message boxes, and dialog boxes, among others.

Although computer system 100 may be configured to provide a premium UI experience in the illustrated embodiment, it will be understood that other embodiments may provide other unique UI experiences wherein presentation of standard UI elements may be unwanted. For example, a gambling machine or specialized kiosk machine may provide a UI experience which is not necessarily "premium," but wherein it may be desirable to conceal the fact that a specialized OS shell is running on top of a standard operating system.

Continuing in FIG. 2, device-readable medium 202 is shown to include a second program of instructions 210, which may comprise a non-dedicated application or generic operating system of the kind indicated above. In the illustrated embodiment, second program 210 includes code 212 and configurable settings 214. Absent execution of first program 206, instructions embodied in second program 210 and executed via processor 204 may cause an unwanted presentation of one or more UI elements from horizontal display surface 102. To illustrate the disadvantageous result, FIG. 1 shows dialog box 106 displayed on the horizontal display surface. The balance of this disclosure provides example systems and methods for avoiding such unwanted UI presentations in environments as described hereinabove.

Presentation of a UI element may be anticipated or unanticipated, depending on the context in which it is invoked. An anticipated presentation may be initiated and/or generated by an operating system independent of user action, and therefore, may be relatively predictable. Anticipated presentations may be gateable, blockable, and/or configurable via public settings exposed by the operating system, e.g. configurable settings 214. Therefore, an example method described hereinafter provides that such settings are reconfigured to prevent the anticipated presentation from occurring-during or prior to the loading of the operating system, for example, and prior to execution of the OS shell.

In contrast, an unanticipated presentation of a UI element may be any newly created, top-level UI construct in the operating system or in an application. For example, in the Windows®, Macintosh®, and Linux® operating systems, any newly created, top-level window may constitute an unanticipated presentation. Such modern operating systems may provide one or more mechanisms to report or allow for the discovery of top-level visible constructs, thereby allowing first program 206 to monitor for the creation of new constructs.

Figure 3:
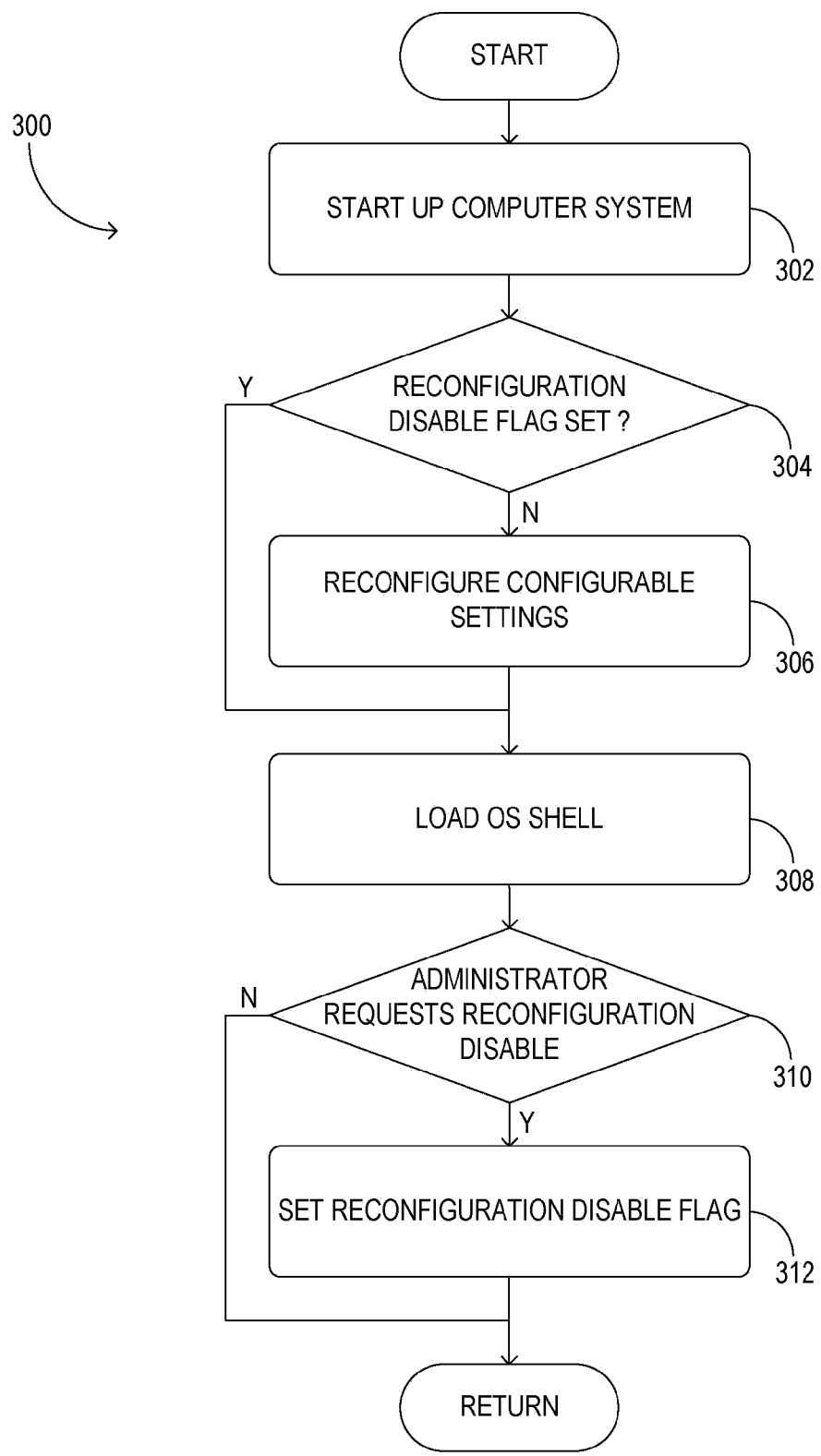
FIG. 3 illustrates an example method to prevent an anticipated presentation of a UI element during execution of a program of instructions on a computer system, in accordance with the present disclosure.

FIG. 3 illustrates an example method 300 to prevent an anticipated presentation of a UI element during execution of a second program of instructions on a computer system. In some embodiments, the second program of instructions may include an operating system of the computer system. In describing the method, continued reference is made to the example configurations illustrated above, which may comprise an example system for controlling one or more of an anticipated presentation and an unanticipated presentation of one or more UI elements on the computer system. It will be understood, however, that the methods disclosed herein may be enabled by other configurations as well.

Method 300 begins at 302, where the computer system is started. The method continues to 304, where a state of a reconfiguration-disabling flag is determined. In some embodiments, the reconfiguration-disabling flag may be set automatically when a user logs onto the computer system using administrator credentials. In this manner, the reconfiguring of the one or more configurable settings may be disabled based on an aspect of a current user of the computer system, e.g. whether or not the current user is an administrator of the computer system. In the same and other embodiments, the reconfiguration-disabling flag may be set or cleared according to an administrator request, as described hereinafter.

Computer systems enabling method 300 may be designed to expose different user classes—developers, administrators, end-users, for example—to different UI experiences, as appropriate for the different roles and system-information needs of each user class. Suppose, for example, that an operating system of the computer system is configured to display a dialog when an application crashes. First program 206 may be configured to allow presentation of the dialog when the user is an administrator, but to suppress presentation of the dialog when the user is an end user. To enable such functionality, first program 206 may include a procedure to determine which user class the current user belongs to based on credentials entered, security access level, etc. First program 206 may further include a procedure to ensure that the public OS settings are properly configured to allow or to suppress an anticipated presentation of such UI elements before allowing the user visual or interactive access to the system. Such a process could include programmatically reconfiguring the configurable settings based on a collection of default settings, overwriting a section of the OS configuration store with the desired state, or other mechanisms.

Continuing in FIG. 3, if the reconfiguration-disabling flag is not set, then at 306, one or more configurable settings of the second program of instructions is reconfigured to prevent the anticipated presentation of the one or more UI elements. In some embodiments, the computer system may include a second processor, the same or different than the first processor. In these embodiments, reconfiguring the one or more configurable settings may prevent the second processor from presenting the one or more UI elements. Such settings may include, for example, a setting that determines whether or not the OS displays a dialog when a device is connected to an exposed USB port, a setting that determines whether or not a UI is displayed when an application crashes, a setting that determines if a UI should be presented to send crash data to a remote server, a setting that determines if the firewall should prompt the user with UI when an application is blocked, a setting that determines if the OS should request security elevation when requested, etc. However, if the reconfiguration-disabling flag is set, then execution of method 300 continues to 308.

At 308, an OS shell of the computer system is loaded. At 310, it is determined whether an administrator of the computer system has requested to disable reconfiguration of the one or more configurable settings. If an administrator has requested to disable reconfiguration of the one or more configurable settings, then at 312, the reconfiguration-disabling flag is set, and method 300 returns. In this manner, the reconfiguring of the one or more configurable settings may be disabled at a request of an administrator of the computer system.

Figure 4:
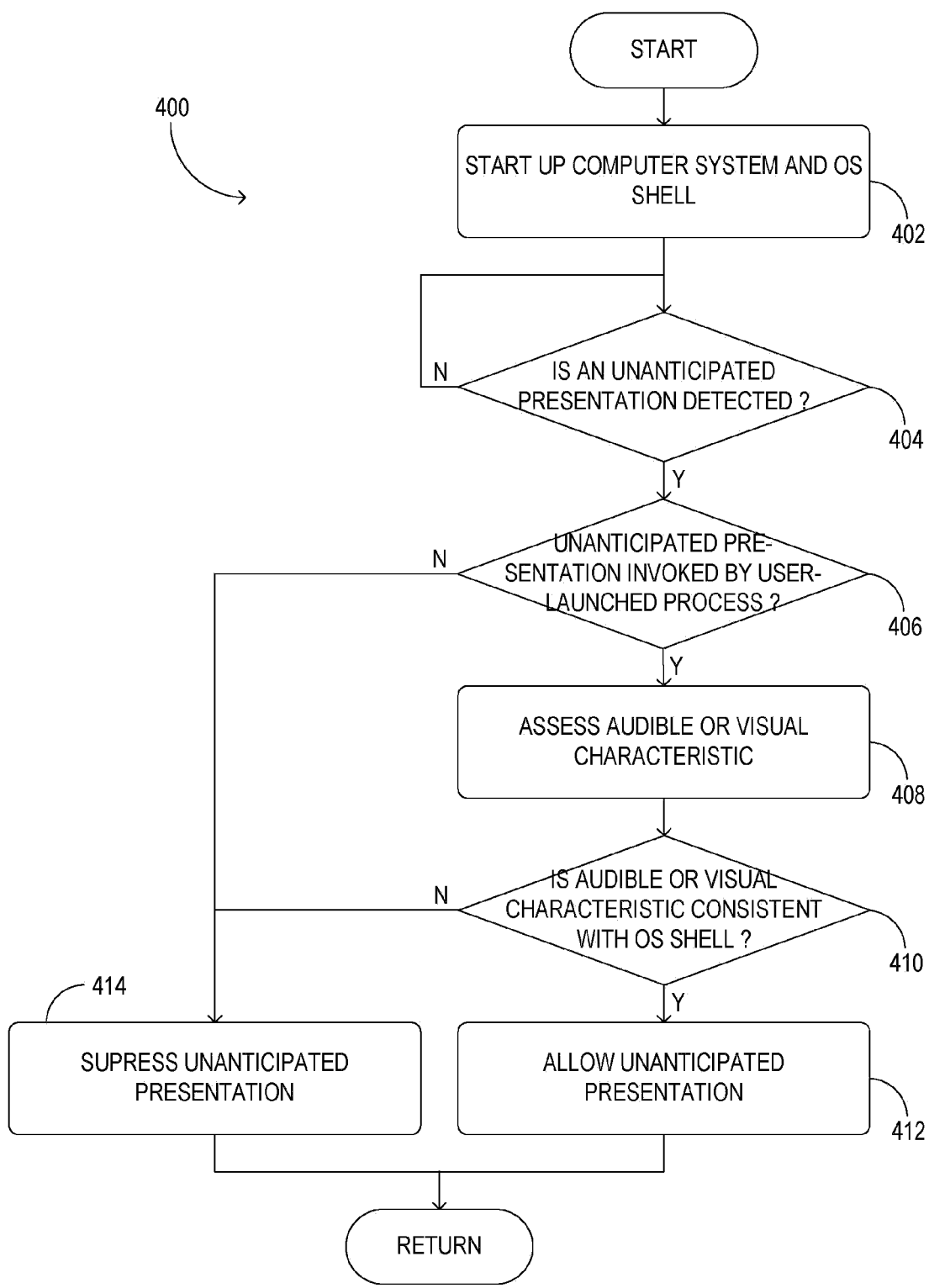
FIG. 4 illustrates an example method to determine whether to allow or to suppress an unanticipated presentation of one or more UI elements during execution of a program of instructions on a computer system, in accordance with the present disclosure.

FIG. 4 illustrates an example method 400 to determine whether to allow or to suppress an unanticipated presentation of one or more UI elements during execution of a third program of instructions on a computer system. In some embodiments, the third program of instructions referred to herein may be the same as the second program of instructions referred to hereinabove. In other embodiments, it may be a different program. In describing the method, continued reference is made to the example configurations illustrated above, which may comprise an example gating system for gating an unanticipated presentation of one or more UI elements on the computer system, i.e., allowing/not allowing the UI elements to be presented based on the method. It will be understood, however, that the methods disclosed herein may be enabled by other configurations as well.

Method 400 begins at 402, where the computer system is started. Execution proceeds to 404, where it is determined whether an unanticipated presentation of one or more UI elements has been invoked. If no unanticipated presentation has been invoked, then execution of method 400 loops back to 404, where testing for unanticipated presentations of UI elements continues. When it is determined that an unanticipated presentation of one or more UI elements has been invoked, then, at 406, the process that invoked the unanticipated presentation is discovered. It is then determined whether the process that invoked the unanticipated presentation was launched by a current user of the computer system. If it is determined that the unanticipated presentation was invoked by a process that was launched by the current user, then at 408, a visual or audible characteristic of the one or more UI elements is assessed. Subsequent steps in the illustrated method provide that a determination of whether to allow or suppress the unanticipated presentation may be based at least partly on the visual or audible characteristic.

Thus, at 410, it is determined whether the visual or audible characteristic is consistent with the navigation experience provided by the OS shell. If the visual or audible characteristic is consistent with the navigation experience, then it is determined that the unanticipated presentation of the UI element will be allowed. However, if it is determined at 406 that the unanticipated presentation was invoked by a process not launched by the current user, or, if the visual or audible characteristic of the UI element is determined, at 410, to be inconsistent with the navigation experience, then at 414, presentation of the of the unanticipated UI element is suppressed. This sequence of conditionals is one example of a heuristic rule, heuristic test, or, as used hereinafter, a 'heuristic' for determining whether to allow or suppress an unanticipated presentation of a UI element. Other examples will be made evident in the balance of this disclosure.

In one, non-limiting example, first program 206 may be configured to suppress unanticipated presentations of UI elements that include title bars, because such UI elements cannot be presented in a user-orientation independent manner, and may violate the user experience guidelines of the user's current navigation experience. Further, the visual or audible characteristic assessed at 408 may be one of a plurality of characteristics assessed according to the first program of instructions to enable the first processor to determine whether to allow or to suppress the unanticipated presentation. Further still, the plurality of characteristics may be adjustable, for example by an administrator of the computer system. More particularly, the characteristics may be extended by appending additional heuristic elements or tests, configured by adjustment of one or more configurable settings within the heuristic elements or tests, and further, one or more of the default characteristics may be replaced by one or more different characteristics.

In another, non-limiting example, first program 206 may be configured to suppress an unanticipated presentation of any UI element that requires the user to respond via a keyboard in instances where no virtual keyboard is provided via the OS shell.

In another, non-limiting example, first program 206 may be configured to supress an unanticipated presentation of any UI element that does not automatically reorient itself to a disposition of the user relative to horizontal display surface 102, or that is unable to accept a pretermined range of input from an input functionality of the horizontal display surface.

In yet another, nonlimiting embodiment, the heuristic applied by first program 206 to determine whether to allow or suppress an unanticipated presentation of a UI element may comprise a series of conditionals. The series of conditionals may be evaluated using direct logic, or in other examples, fuzzy logic. One example series of conditionals may comprise: (1) Was the UI element created by a process that was launched from the user-accessible OS shell? (2) Does the UI element conform to the navigation experience provided by the OS shell, e.g., is it full screen; does it lack a title bar? (3) Does the UI element load one or more system libraries for accepting available user input mechanisms available to a user of the computer system, e.g., does the UI element load surface-input API libraries into it's memory? (4) Did the UI element appear when the process owning the UI element was already was already presenting a UI to the user of the computer system? (5) Does the UI element contain content relevant to the user given the current context? An affirmative evaluation of one or more of the above conditionals may signal that the unanticipated presentation of the UI element may be allowed, in this example.

The heuristic rule that is used by first program 206 to determine whether to allow or to suppress the unanticipated presentation may, by default, be configured for a limited range of applications and/or operating systems. Therefore, there may be particular instances wherein the default heuristic yields an inappropriate determination. For example, an application intended for the computer system may invoke a UI element having title bar, which by default may be suppressed. However, the configurability and replaceability referred to above may enable a developer or an administrator to provide his or her own test within the heuristic, so that the heuristic is less likely to yield an inappropriate determination. Extension and/or replacement of characteristics within the heuristic rule may be enabled by inserting/replacing code (script, executable code, etc.), by configuring one or more configurable settings of first program 206, or in any other suitable manner.

In some embodiments, a heuristic may be applied to determine whether to allow a native presentation of a UI element, to suppress the native presentation of the UI element, or enable a reformulated UI presentation including at least some of the content of the UI element. Further, the heuristic may be modified in response to a request of an administrator of the computer system.

In one example, the heuristic may be modified adaptively (e.g., automatically) according to a record of administrator-requested modification of the heuristic. In another example, the heuristic may be modified adaptively based on a record of user termination of the second program of instructions pursuant to suppression of the unanticipated presentation. In still another example, the heuristic may be modified adaptively based on a query-and-response of a current user of the computer system, wherein the second program of instructions was launched by the current user.

Thus, an ability of the heuristic to modify and/or adapt can take many forms. It may be implicit, e.g. first program 206 may monitor the usage of the application that generated the unanticipated presentation, and may raise the tolerance for the UI elements included therein if the application usage drops, statistically, after instances of suppression. Or, it may be highly explicit, e.g., first program 206 may notify the user that a presentation of UI elements was suppressed, and it may query the user to determine if they think the UI elements should have been presented. In various embodiments, user-response data may be factored into the heuristic in real time or otherwise processed via a neural-network approach, where a decision to allow or suppress a unanticipated UI presentations may be affected in a longer-term, cumulative manner.

In yet another example, the heuristic may provide that the unanticipated presentation be allowed when the presentation of one or more UI elements included in the presentation are referenced on a white list associated with first program 206. Thus, for all the effort invested in the above heuristics, there will inevitably be cases where a user (e.g., an administrator) would prefer that a particular UI presentation be allowed although the first program of instructions would suppress it. Therefore, a mechanism is provided to enable such a user to specify particular UI presentations, in terms of particular UI elements or aspects of UI elements (textual content, size, process owner, path of an executable, etc.), that can bypass the heuristic. For example, an administrator may reckon that an unanticipated presentation of UI elements from a virus scanner should be allowed, and may add the virus-scanner process to his or her white list, so that UI from the virus scanner is presented, even if it would normally be suppressed. In addition, other criteria may be specified on the white list, such as a time or date range when the presentation is to be allowed, in one, non-limiting example.

Figure 5:
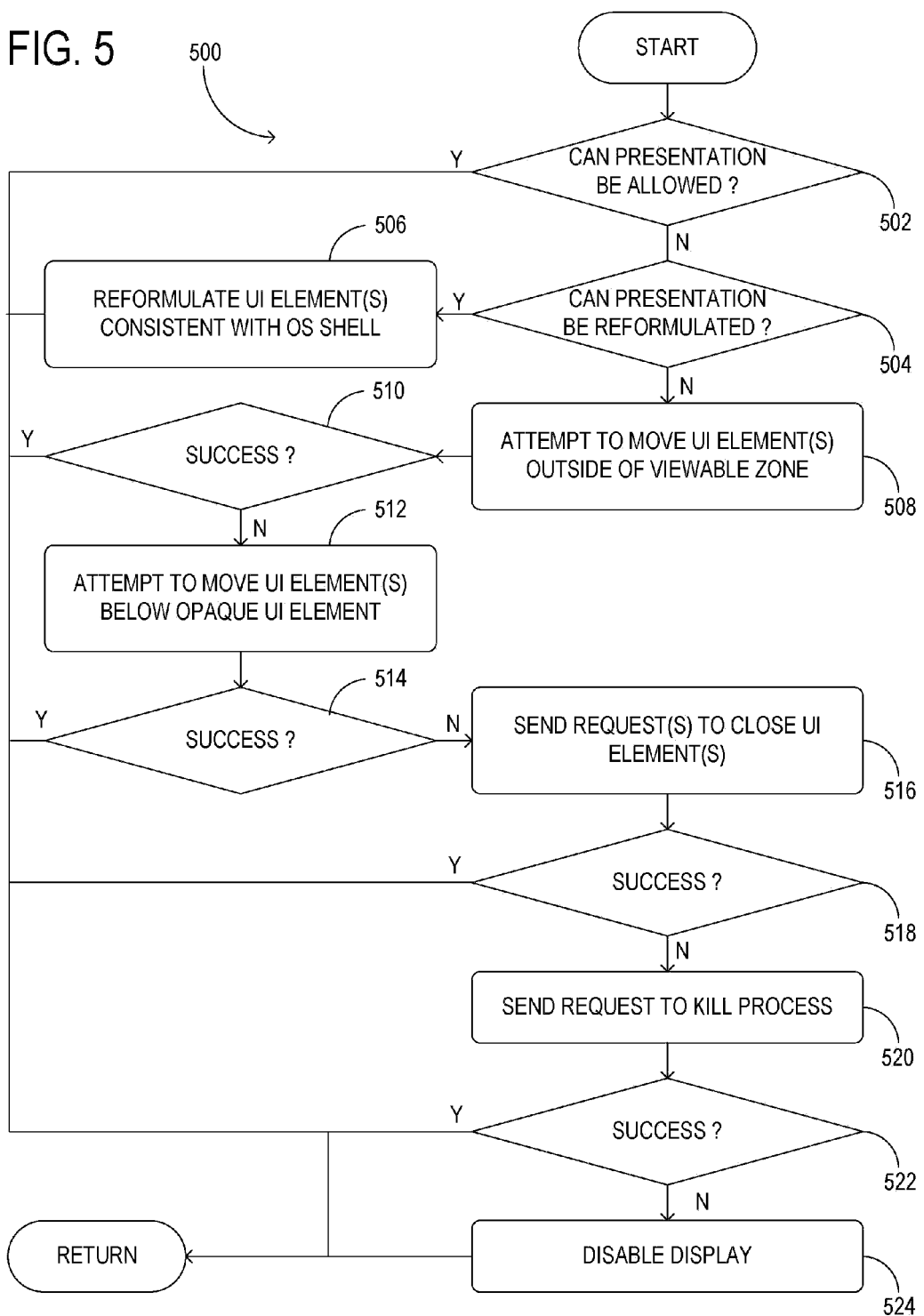
FIG. 5 illustrates an example method by which an unanticipated presentation of one or more UI elements may be allowed, suppressed, or reformulated as determined according to a heuristic, in accordance with the present disclosure.

FIG. 5 illustrates an example method 500 by which an unanticipated presentation of one or more UI elements may be suppressed and/or reformulated as determined according to a heuristic. Method 500 begins at 502, where it is determined, according to the heuristic, whether the unanticipated presentation in its native form can be allowed. As described above, for example, where the unanticipated presentation may be allowed in its native form if it is determined to be consistent with a user-navigation experience provided by the OS shell. If it is determined that the presentation can be allowed, then the method returns. However, if it is determined that it cannot be allowed, then at 504, it is determined whether the contents of the one or more UI elements included in the unanticipated presentation can be reformulated in a manner consistent with the navigation experience provided by the OS shell. First program 206 may make the determination by inspecting one or more input/output components of the UI element-output text content, output graphical content, user-input modes enabled, etc. If it is determined that reformulation is possible, then, at 506, the reformulation is enacted.

In certain unanticipated presentations, only the appearance of the included UI elements may be objectionable, while the information they convey may be important. One such presentation may be the appearance of an OS dialog indicating that an application has crashed. In that even, first program 206 may be configured to gather information from the dialog in various ways (scraping and parsing text from the UI element, capturing generic information about the UI element (window title, severity, etc.). First program 206 may further be configured to reformulate the information in a manner consistent with the navigation experience provided by the OS shell, and to present one or more new UI elements conveying at least part of the information content of the original UI elements. However, if it is determined that such reformulation is not possible, then at 508, an attempt is made to move the one or more UI elements outside of a viewable zone of the display surface. Depending on details of the system, such an action may or may not be successful in suppressing the unanticipated presentation before the user perceives the UI elements included therein. Therefore, at 510, it is determined whether the action at 508 has successfully suppressed the unanticipated presentation (i.e., whether it has prevented display of the included UI elements or caused them to vanish within a predetermined period of time). If it is determined that the action at 508 has successfully suppressed the unanticipated presentation, then the method returns.

Otherwise, at 512, an attempt is made to move the one or more UI elements below an opaque UI element displayed on the horizontal display surface. The opaque UI element chosen at this step may be a pre-existing UI element, or it may be a UI element specially configured to mask the one or more UI elements of the unanticipated presentation as the need arises. If it is determined, at 514, that the action at 512 has successfully suppressed the unanticipated presentation, then the method returns.

Otherwise, at 516, a request is sent to close the one or more UI elements included in the unanticipated presentation. If it is determined, at 518, that the action at 516 has successfully suppressed the unanticipated presentation, then the method returns.

Otherwise, at 520, a request to kill the program invoking the unanticipated presentation is sent to the operating system. If it is determined, at 522, that the action at 520 has successfully suppressed the unanticipated presentation, then the method returns. Otherwise, at 524, the horizontal display surface is disabled, and the method returns.

Different operating systems may have different restrictions on the ability of one process to affect UI elements of another process. Therefore, the illustrated method applies suppression steps in a sequence of increasing obtrusiveness and decreasing chance of being restricted.

In method 500, suppressing a presentation of the unanticipated UI element may comprise executing a first action from the group consisting of steps 508, 512, 516, 520, and 524, and executing a second action from the same group if that action fail to suppress the unanticipated presentation, a third action if the second action fail, and so on. In some embodiments, a degree of success of one or more of the indicated actions in suppressing the unanticipated presentation may be recorded over a course of multiple sessions of operation of the computer system. In these embodiments, the particular sequence of actions executed may be varied from that of the illustrated embodiment, and, may be determined partly based on an analysis of the record of a success.

In other embodiments, related methods akin to method 500 may further include analysis of a record of success and failure of the various included actions, and, a determination of whether the end result (e.g. the time required to suppress the unanticipated presentation) meets the required standards for a premium UI experience. For example, if an unanticipated presentation of UI elements appears, and if first program 206 is able to move the UI elements off the viewable zone of the display screen but is unable to close one or more of the UI elements, the method may respond by rendering the horizontal display surface inoperable, or otherwise determine that suppression was adequate and allow the display to continue. Such a determination could be based on a variety of factors, such as how frequently the unanticipated presentation has appeared, what time of day it is, whether the process owning the presentation is emitting sound, the content of the UI elements, or based on virtually any other factor.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A computer system for controlling user-interface (UI) element presentation, the computer system comprising:
a processor;
a machine-readable storage device operatively coupled to the processor and embodying a program of instructions that cause the processor to:
automatically discover a visual or input characteristic of a UI element when presentation of that element is invoked by an invoking process;
allow the presentation of the UI element if the invoking process was launched from an operating-system (OS) shell running on the computer system, if the UI element conforms to a premium navigation experience provided by the OS shell, if the UI element loads one or more system libraries for accepting user input available to a user of the computer system, if the invoking process was already presenting a UI to the user, or if a visual or input characteristic of the UI element is consistent with the OS shell; and
suppress presentation of the UI element if the invoking process was not launched from the OS shell, if the UI element does not conform to the premium navigation experience, if the UI element does not load the one or more system libraries for accepting user input available to the user, if the invoking process was not already presenting a UI to the user, and if the visual or input characteristic is not consistent with the OS shell, such suppression including execution of a sequence of one or more suppression steps from an ordered list in order of increasing obtrusiveness and decreasing likelihood of being restricted by the OS shell until presentation is suppressed, the ordered list including:
attempting to move the UI element outside of a viewable zone of a display of the computer system,
attempting to move the UI element below an opaque UI element of the display,
sending a request to the process to close the UI element, and
sending a request to one or more of the OS and the invoking process to end the invoking process, and disabling the display.

2. The system of claim 1 wherein the program of instructions further enables the processor to reconfigure a setting of the OS to prevent an anticipated presentation of the UI element on the computer system.

3. The system of claim 1, wherein the setting is reconfigured after a start-up of the computer system but before the OS shell of the computer system is loaded.

4. The system of claim 1, wherein the program of instructions further enables the processor to disable the reconfiguring of the setting if requested by an administrator of the computer system.

5. The system of claim 1, wherein the program of instructions further enables the processor to determine when to disable the reconfiguring of the setting based on a privilege level of a current user of the computer system.

6. The system of claim 1, wherein the program of instructions causes the processor to suppress the presentation also if the invoking process was not launched by a current user of the computer system.

7. The system of claim 1 wherein the program of instructions causes the processor to reformulate content of the UI element to be consistent with the OS shell, and to present on the computer system a reformulated UI element including at least some of the content.

8. A computer system for controlling user-interface (UI) element presentation, the computer system comprising:
   a processor;
   a machine-readable storage device operatively coupled to the processor and embodying a program of instructions that cause the processor to:
   automatically discover a visual or input characteristic of a UI element when that element is invoked by an invoking process on the computer system;
   automatically discover the invoking process;
   apply a heuristic to determine whether to allow or to suppress the presentation, the heuristic including one or more of:
      determining whether the invoking process was launched from an operating-system (OS) shell running on the computer system,
      determining whether the UI element conforms to a premium navigation experience provided by the OS shell,
      determining whether the UI element loads one or more system libraries for accepting user input available to a user of the computer system, and
      determining whether the invoking process was already presenting a UI to the user; and
   if it is determined that the presentation of the UI element is to be suppressed, then executing a sequence of one or more suppression steps from an ordered list in order of increasing obtrusiveness and decreasing likelihood of being restricted by the OS until the presentation is suppressed, the ordered list including:
      attempting to move the UI element outside of a viewable zone of a display of the computer system,
      attempting to move the UI element below an opaque UI element of the display,
      sending a request to the process to close the UI element,
      sending a request to one or more of the OS and the invoking process to end the invoking process, and
      disabling the display.

9. The system of claim 8, wherein the first program of instructions enables the processor to modify the heuristic directly, in response to a request of an administrator of the computer system, and, to modify the heuristic adaptively according to a record of administrator-requested modification of the heuristic.

10. The system of claim 9, wherein the first program of instructions further enables the processor to adaptively modify the heuristic based on a record of user termination of the process invoking the presentation pursuant to suppression of the presentation.

11. The system of claim 9, wherein the first program of instructions further enables the processor to adaptively modify the heuristic based on a query-and-response of the user of the computer system, wherein the invoking process was launched by the user.

12. The system of claim 8, wherein the program of instructions further enables the processor to determine to allow the presentation when one or more of the presentation and the UI element are referenced on a white list associated with the program of instructions.

13. Enacted in a computer system running an operating system (OS) shell, a method to control user-interface (UI) element presentation on a display surface of the computer system, the method comprising:
   when presentation of a UI element on the display surface is invoked, automatically discovering an invoking process that has invoked the presentation;
   automatically discovering a visual or input characteristic of the UI element;
   determining that the presentation of the UI element is to be suppressed if the invoking process was not launched from an operating-system (OS) shell running on the computer system, if the UI element does not conform to a premium navigation experience provided by the OS shell, if the UI element does not load one or more system libraries for accepting user input available to a user of the computer system, if the invoking process was not already presenting a UI to the user, if the visual or input characteristic is inconsistent with the OS shell, or if the process invoking the presentation was not launched by a user of the computer system; and
   if it is determined that the presentation of the UI element is to be suppressed, then executing a sequence of one or more suppression steps from an ordered list in order of increasing obtrusiveness and decreasing likelihood of being restricted by the OS of the computer system, the ordered list including:
      attempting to move the UI element outside of a viewable zone of a display of the computer system,
      attempting to move the UI element below an opaque UI element of the display,
      sending a request to the process to close the UI element,
      sending a request to one or more of the OS and the invoking process to end the process, and
      disabling the display.

14. The method of claim 13, wherein the sequence of suppression steps is determined based on analysis of a record of a success of one or more of the actions from the sequence in suppressing UI element presentation.

* * * * *